(12) United States Patent
Andrade (10) Patent No.: US 7,975,138 B2
(45) Date of Patent: Jul. 5, 2011

(54) SYSTEMS AND METHODS FOR MUTUALLY AUTHENTICATED TRANSACTION COORDINATION MESSAGES OVER INSECURE CONNECTIONS

(75) Inventor: Juan M. Andrade, Morristown, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 989 days.

(21) Appl. No.: 11/779,510

(22) Filed: Jul. 18, 2007

(65) Prior Publication Data

US 2009/0024851 A1 Jan. 22, 2009

(51) Int. Cl.
*H04L 29/06* (2006.01)
*H04L 9/32* (2006.01)
*G06F 7/04* (2006.01)

(52) U.S. Cl. ............ 713/168; 713/150; 713/176; 726/2; 726/20

(58) Field of Classification Search ................. None
See application file for complete search history.

(56) References Cited

U.S. PATENT DOCUMENTS

| | | | | |
|---|---|---|---|---|
| 5,737,515 A | * | 4/1998 | Matena | 714/23 |
| 6,076,078 A | * | 6/2000 | Camp et al. | 705/65 |
| 6,275,863 B1 | * | 8/2001 | Leff et al. | 709/248 |
| 6,775,770 B1 | * | 8/2004 | Davis et al. | 713/156 |
| 6,895,510 B1 | * | 5/2005 | Benantar et al. | 726/9 |
| 7,143,136 B1 | * | 11/2006 | Drenan et al. | 709/204 |
| 7,509,426 B2 | * | 3/2009 | Park et al. | 709/227 |
| 7,660,903 B2 | * | 2/2010 | Kett et al. | 709/229 |
| 2006/0174103 A1 | * | 8/2006 | Verma et al. | 713/151 |

OTHER PUBLICATIONS

McDaniel, "Secure High Performance Group Communication", Sep. 1997, pp. 1-17.*
Tang et al., "A Transaction Model for Grid Computing", APPT 2003, LNCS, pp. 382-386.*

* cited by examiner

*Primary Examiner* — Kambiz Zand
*Assistant Examiner* — William S Powers
(74) *Attorney, Agent, or Firm* — Fliesler Meyer LLP (57) ABSTRACT

Systems and methods are provided that enable authentication of transaction coordination messages sent via insecure connections. Also provided are systems and methods for controlling transaction coordination and recovery. In many embodiments, there is an exchange between a coordinator and a sub-coordinator, such that the coordinator provides the sub-coordinator with a coordinator token, and the sub-coordinator provides the coordinator with a sub-coordinator token. The coordinator and sub-coordinator tokens are used to authenticate transaction coordination messages sent over one or more insecure connections between the coordinator and the sub-coordinator.

30 Claims, 5 Drawing Sheets

SYSTEMS AND METHODS FOR MUTUALLY AUTHENTICATED TRANSACTION COORDINATION MESSAGES OVER INSECURE CONNECTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present invention relate to systems and methods that enable authentication of transaction coordination messages sent via insecure connections. Embodiments of the present invention also relate to systems and methods for controlling transaction coordination and recovery.

BACKGROUND

A transaction is one or more operations on a physical and abstract application state that must all complete, or if they do not all complete, then must all be reversed (i.e., rolled back). For example, a transaction may involve moving money from one bank account to another, by debiting a first account, and crediting a second account. In this example, the entire transfer operation must complete, or if there is a failure after the debit but before the credit, then the debit is rolled back. A fundamental feature of an application server, such as the WebLogic Server product, is transaction management. Transactions are a means to ensure that database transactions are completed accurately and that they take on all "ACID" properties of a high-performance transaction, including:

Atomicity—all changes that a transaction makes to a database are made permanent; otherwise, all changes are rolled back.

Consistency—a successful transaction transforms a database from a previous valid state to a new valid state.

Isolation—changes that a transaction makes to a database are not visible to other operations until the transaction completes its work.

Durability—changes that a transaction makes to a database survive future system or media failures.

WebLogic Server, a product of BEA Systems, Inc. of San Jose, Calif., is an example of application server software that supports both distributed transactions and a two-phase commit protocol for enterprise applications. A distributed transaction is a transaction that updates multiple resource managers (such as databases) in a coordinated manner. Resource managers can be on different computers or domains. In contrast, a local transaction updates a single resource manager.

A domain is a unit of administration and processing grouping several application servers that may be running on the same or different computers. In one embodiment, a domain is a logically related group of resources. In one embodiment, domains include a special server instance called the Administration Server, which is the central point from which an administrator configures and manages all resources in the domain.

In the context of this document an insecure connection is a network connection between two application servers running on the same domain or in different domains that is lacking network transport security mechanisms such as the Secure Sockets Layer (SSL) or Transport Layer Security (TLS).

The two-phase commit protocol is a method of coordinating a single transaction across two or more resource managers. It guarantees data integrity by ensuring that transactional updates are committed in all of the participating resource managers, or are fully rolled back out of all the resource managers, reverting to the state prior to the start of the transaction. In other words, either all the participating resources are updated, or none of them are updated.

Distributed transactions typically involve the following participants:

Transaction originator—initiates the transaction. The transaction originator can be, e.g., a user application, an Enterprise JavaBean (EJB), or a Java Messaging Server (JMS) client.

Transaction manager—manages transactions on behalf of application programs. A transaction manager coordinates commands from application programs to start and complete transactions by communicating with all resource managers that are participating in those transactions. When resource managers fail during transactions, transaction managers help resource managers decide whether to commit or roll back pending transactions. Transaction managers are also known as transaction subsystems.

Recoverable resource—provides persistent storage for data. The resource is most often a database.

Resource manager—provides access to a collection of information and processes.

Transaction aware Java Database Connectivity (JDBC) drivers are common resource managers. Resource managers provide transaction capabilities and permanence of actions; they are entities accessed and controlled within a distributed transaction. A set of operations made on behalf of a transaction on a particular resource manager is called a transaction branch.

The first phase of the two-phase commit protocol is called the prepare phase, or simply phase 1. The required updates are recorded in a transaction log file, and the resource must indicate, through a resource manager, that it is ready to make the changes. Resources can either vote to commit the updates or to roll back to the previous state. The second phase of the two-phase commit protocol is called the commit phase, or simply phase 2. What happens in the second phase (i.e., the commit phase) depends on how the resources vote. If all resources vote to commit, all the resources participating in the transaction are updated. If one or more of the resources vote to roll back, then all the resources participating in the transaction are rolled back to their previous state.

Transactions are appropriate in the example situations described below (although these situations are merely illustrative and not exhaustive).

As a first example, the client application needs to make invocations on several objects, which may involve write operations to one or more databases. If any one invocation is unsuccessful, any state that is written (either in memory or, more typically, to a database) must be rolled back. For example, consider a travel agent application. The client application needs to arrange for a journey to a distant location; for example, from Strasbourg, France, to Alice Springs, Australia. Such a journey would inevitably require multiple individual flight reservations. The client application works by reserving each individual segment of the journey in sequential order; for example, Strasbourg to Paris, Paris to New York, N.Y. to Los Angeles. However, if any individual flight reservation cannot be made, the client application needs a way to cancel all the flight reservations made up to that point. The client application needs a conversation with an object managed by the server application, and the client application needs to make multiple invocations on a specific object instance. The conversation may be characterized by one or more of the following:

data is cached in memory or written to a database during or after each successive invocation;

data is written to a database at the end of the conversation;

the client application needs the object to maintain an in-memory context between each invocation;

each successive invocation uses the data that is being maintained in memory across the conversation;

if during the conversation there is a failure, the client application needs the ability to cancel all database write operations that may have occurred during or at the end of the conversation.

As an alternate example, consider an Internet-based online shopping cart application. Users of the client application browse through an online catalog and make multiple purchase selections. When the users are done choosing all the items they want to buy, they proceed to check out and enter their credit card information to make the purchase. If the credit card check fails, the shopping application needs a mechanism to cancel all the pending purchase selections in the shopping cart, or roll back any purchase transactions made during the conversation. Within the scope of a single client invocation on an object, the object performs multiple edits to data in a database. If one of the edits fails, the object needs a mechanism to roll back all the edits. In this situation, the individual database edits are not necessarily using Enterprise Java Beans (EJBs) or Remote Method Invocations (RMIs). A client, such as an applet, can obtain a reference to the Transaction and TransactionManager objects, using Java Naming and Directory Interface (JNDI), and start a transaction.

As another example, consider a banking application (mentioned above). The client invokes the transfer operation on a teller object. The transfer operation requires the teller object to make the following invocations on the bank database: invoking the debit method on one account; and invoking the credit method on another account. If the credit invocation on the bank database fails, the banking application needs a mechanism to roll back the previous debit invocation.

Application servers that support distributed transactions, such as the WebLogic Server, are typically unable to process secure transactions coordination calls over insecure connections.

A possible solution to processing transaction coordination calls over insecure connections is the use of transport security—Secure Sockets Layer (SSL) or Transport Layer Security (TLS) mutual authentication. However, this solution is not always viable.

A problem with issuing transaction coordination calls over insecure connections is that an attacker can use a man-in-the-middle attack to obtain information about a transaction coordinator and sub-coordinators, and use this information to maliciously alter the termination of a transaction. Accordingly, there is still a need for a solution that would protect transaction coordination messages against man-in-the-middle attacks. Preferably, such a solution would require minimal administrative setup and have a minimal impact on performance.

BRIEF SUMMARY

Many embodiments of the present invention relate to performing an exchange between a coordinator and a sub-coordinator, such that the coordinator provides the sub-coordinator with a coordinator token, and the sub-coordinator provides the coordinator with a sub-coordinator token. The coordinator and sub-coordinator tokens are used to authenticate transaction coordination messages sent over one or more insecure connections between the coordinator and the sub-coordinator.

Certain embodiments of the present relate to methods for use by a coordinator hosted by an application server. Such methods enable the coordinator to exchange transaction coordination messages over one or more insecure connections with a sub-coordinator hosted by a second application server, where transaction coordination messages are for use in performing a transaction. Such methods include generating a coordinator token, and sending the coordinator token to the sub-coordinator. When a sub-coordinator token is received from the sub-coordinator, the sub-coordinator token is used to generate a first digital signature based on a transaction coordination request message. The transaction coordination request message and the first digital signature are sent to the sub-coordinator, whereby the first digital signature is for enabling the sub-coordinator to authenticate the transaction coordination request message. Thereafter, a transaction coordination reply message and a second digital signature are received from the sub-coordinator, if the sub-coordinator successfully authenticated the transaction coordination request message. The coordinator token or the sub-coordinator token is used to regenerate the second digital signature based on the transaction coordination reply message. The transaction coordination reply message is authenticated if the second digital signature and the regenerated second digital signature match.

In accordance with specific embodiments, the application server hosting the coordinator is in a first domain and the second application server hosting the sub-coordinator is in a second domain. Alternatively, the application server hosting the coordinator is in a first domain and the second application server hosting the sub-coordinator is also in the first domain.

In accordance with specific embodiments, the initial sending and receiving of the coordinator and sub-coordinator tokens takes place over one or more secure connections, and the sending and receiving of the transaction coordination request message and the transaction coordination reply message are over one or more insecure connections.

In accordance with specific embodiments, the generated coordinator token is unique to the transaction.

In accordance with certain embodiments, the generated the coordinator token has a period of validity and can be used for multiple transactions that occur within the period of validity.

Specific embodiments of the present invention also include regenerating the coordinator token if the application server hosting the coordinator crashes before the transaction is completed.

In accordance with specific embodiments of the present invention, the sub-coordinator token can be stored so that the coordinator can retrieve the sub-coordinator token if the server hosting the coordinator crashes before the transaction is completed.

Some embodiments include specifying, to the sub-coordinator, an authentication algorithm to be used. In such embodiments, not receiving a sub-coordinator token from the sub-coordinator, following the sending of the coordinator token, can be interpreted as an indication that the sub-coordinator cannot support the specified algorithm.

In accordance with specific embodiments, the coordinator uses the sub-coordinator token (received from the sub-coordinator over a secure connection) to encrypt a transaction coordination request message, which the coordinator sends to the sub-coordinator over an insecure connection. The coordinator thereafter receives an encrypted transaction coordination reply message from the sub-coordinator over an insecure connection, if the sub-coordinator was able to decrypt and thereby authenticate the transaction coordination request message. The coordinator can then decrypt the encrypted transaction coordination reply message using the coordinator token or the sub-coordinator token. The transaction coordination reply message is authenticated, if the transaction coordination reply message is successfully decrypted.

This summary is not intended to be a complete description of, or limit the scope of, the invention. Other features, aspects, and objects of the invention can be obtained from a review of the specification, the figures, and the claims.

DETAILED DESCRIPTION

Broadly described, specific embodiments of the present invention provide authenticated transaction coordination messages over one or more insecure connections. While various implementations described herein describe the invention in terms of Java, and particularly EJB implementations, it will be evident to one skilled in the art that the transaction property mechanisms described herein can be used with other systems and other implementations.

Figure 1:
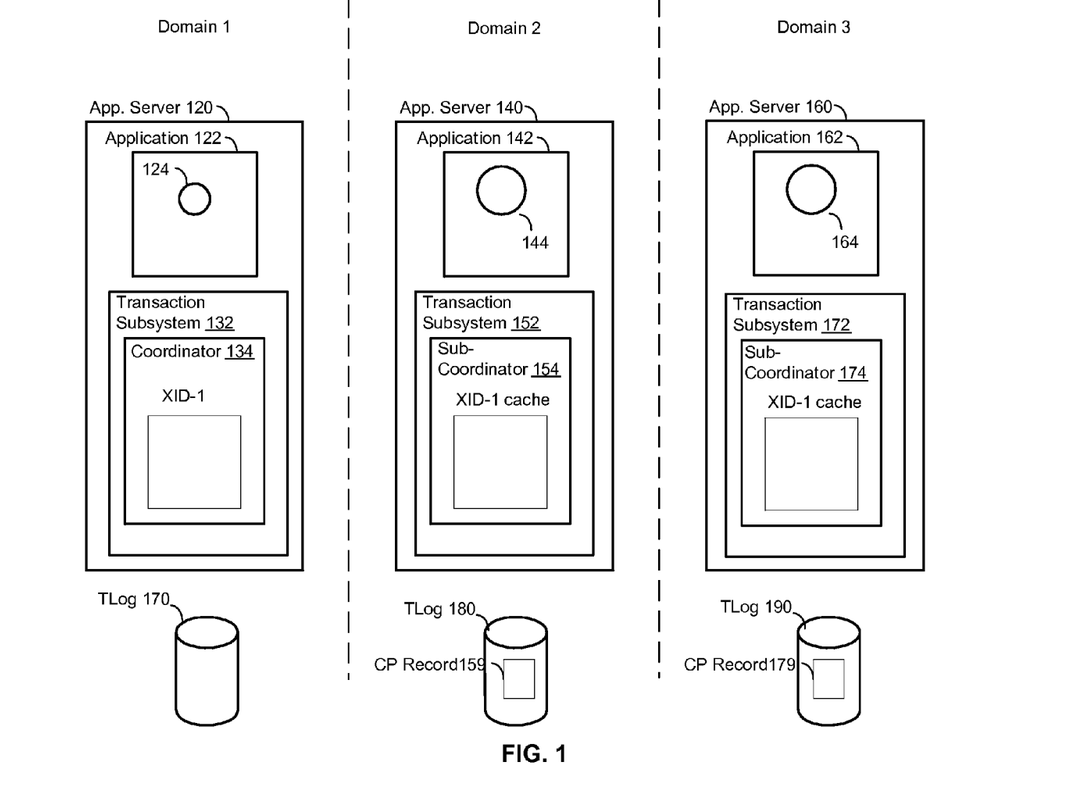
FIG. 1 is a high level block diagram that illustrates an exemplary environment in which embodiments of the present invention are useful.

FIG. 1 will first be used to illustrate an exemplary environment in which embodiments of the present invention are useful. FIG. 1 shows an application server 120 in a first domain (Domain 1) and an application server 140 in a second domain (Domain 2). The application server 120 includes at least one application 122 and a transaction subsystem 132 (also known as a "transaction management subsystem" or a "transaction manager"). Similarly, the application server 140 includes at least one application 142 and a transaction subsystem 152. A transaction subsystem (e.g., 132, 152), which can be a software component (e.g., object) of an application server, manages transactions with clients and other servers. In one embodiment, if application 142 transactionally calls application 162 then, typically, a coordination tree is formed such that the coordinator in Domain 1 coordinates the transaction with the sub-coordinator in Domain 2 which coordinates the sub-coordinator in Domain 3. In one embodiment, the coordinator coordinates the sub-coordinator in Domain 3 directly, thus flattening the transaction coordination tree to a two-level tree. This flattening of the transaction coordination tree also reduces the number of log records.

A distributed transaction involves updates that span multiple operations on resource managers (e.g., databases, EJBs, JMSs, etc.). A transaction subsystem coordinates these updates across multiple resource managers using the two-phase commit protocol, which includes a "prepare phase" and a "commit phase," as mentioned above.

In accordance with an embodiment of the present invention, the transaction subsystem includes a transaction coordinator component (referred to hereafter simply as a "coordinator") and a sub-coordinator component (referred to hereafter simply as a "sub-coordinator"). These components can be implemented by the same component (e.g., one object) or separate components (e.g., separate objects). Either way, these components are identified by the "role" they play in a particular transaction. More specifically, a coordinator directs the execution of a commitment algorithm and controls one or more sub-coordinators. For the purpose of this description, the coordinator corresponds to the transaction subsystem (e.g., 132) of the application server (e.g., 120) that initiates a transaction, and the sub-coordinator corresponds to the transaction subsystem (e.g., 152) of another application server (e.g., 140) that the application server (120), which initiated the transaction, may call to assist with completing the transaction. Other sub-coordinators (e.g., 174) on other applications servers (e.g., 160) may also be involved in the transaction and may need to be coordinated by coordinator 134.

For ease of illustration, the transaction subsystem 132 is shown as including only a coordinator component 134, and the transaction subsystem 152 is shown as including only a sub-coordinator component 154. However, it should be understood that the transaction subsystem 132 also includes a sub-coordinator component, or the component that acts as the coordinator can also act as a sub-coordinator. Similarly, the transaction subsystem 152 also includes a coordinator component, or the component that acts as the sub-coordinator can also act as a coordinator.

In accordance with a specific embodiment, a transaction coordinator is an object, running on an application server, that implements the Java Enterprise Edition (JEE) Java Transaction API (JTA), and a transaction sub-coordinator is an object, also implementing JTA, running on another application server in a different domain than the application server on which the transaction coordinator is running. As used in this document, the terms coordinator and sub-coordinator refer to different roles for a transaction coordinator. In accordance with an embodiment, the coordinator and sub-coordinator are singletons, i.e., there is only one coordinator and one sub-coordinator per application server. Having a singleton facilitates implementation and communication, but this is not required for other embodiments.

Still referring to FIG. 1, the application 122 initiates a transaction 124, e.g., in response to a request from a client, on behalf of a client, or on its own behalf. The application server 120 assigns the transaction 124 a unique transaction identifier (XID), which is useful for identifying the transaction, for example in a Transaction Log (TLOG) 170. The transaction subsystem 132 is a component of the application server 120 and the transaction subsystem intercepts transaction calls issued by the application 122. The transaction subsystem 132 assigns the XID to the transaction 124.

The XID is an example of Transaction Propagation Context (TPC) that is propagated during an application call, e.g., to an Enterprise Java Bean (EJB), or to a Java Message Service (JMS) Server. Other TPC can include alternative and/or additional information.

Specific embodiments of the present invention include or occur during a Transaction Context Propagation (TCP) phase and a Transaction Coordination and Recovery (TCR) Phase. The TCP phase is also sometimes referred to simply as the Transaction Propagation phase. The TCR phase, as described below, can be separated into two further phases, i.e., a Transaction Coordination phase and a Transaction Recovery phase. Each of these phases will be described below.

Transaction Context Propagation (TCP) Phase

An application server (e.g., 120) propagates transaction context to get an application (e.g., 122) involved with a transaction. Propagation of the transaction context allows the coordinator and sub-coordinator to use application calls to carry additional information that would allow for optimizations to the two-phase commitment algorithms.

Transaction context is propagated during application calls, e.g., to an EJB, JMS server, etc. The transaction context includes information about the transaction and its coordinator. In accordance with an embodiment, when a sub-coordinator becomes involved in a transaction, information about the sub-coordinator can be added to the transaction context. This information (i.e., the transaction context) passes on requests and replies of the transaction (also referred to as transaction coordination requests and transaction coordination replies, respectively), as will be described in more detail below.

It is assumed that transactional application calls are issued over one or more trusted connections, which are set and controlled, e.g., using standard J2EE and/or application server security mechanisms (e.g., WLS security mechanisms). The connections are trusted because they can be secured and using the security mechanism both parties can ensure proper authentication, and therefore trust the information sent over the connection. A corollary, derived from this assumption, is that an implicit trust can be assumed between a coordinator and a sub-coordinator for propagating transaction context with application calls. For example, the fact that standard JMS and EJB security allows a first server to make an application call to a second server means that there is trust between the coordinator on the first server and the sub-coordinator on the second server. It is also assumed that transactions are committed asynchronously and/or do not necessarily use the same network connections created for carrying application calls.

In accordance with an embodiment of the present invention, when an application 122 initiates a transaction 124, the transaction subsystem 132 (of the application server 120 hosting the application 122) intercepts transaction calls issued by the application 122, and assigns the transaction 124 to its coordinator 134. Thereafter, the transaction is assigned an XID and TPC is included with the transactional application call. An exemplary transactional application call is a call issued within the context of a transaction to an object (e.g., a J2EE object) located on the same application server 120 or to an object 144 located on another application server 140. Where the transaction call is to an object located on another application server, e.g., application server 140, the sub-coordinator 154 of the other application server 140 performs transaction control operations on behalf of the coordinator 134.

When a transaction subsystem assigns a coordinator to a transaction, the coordinator generates a Coordinator Token (CToken) for that transaction. Also, when a sub-coordinator is involved with a transaction, the sub-coordinator generates another token, referred to as the Sub-Coordinator Token (SToken). In accordance with an embodiment, the CToken and the SToken are symmetric encryption keys, which means the tokens can be used for encrypting and decrypting data. Preferably, the tokens should be unique for each transaction. Also, preferably, the token can be re-generated if the token is lost when an application server hosting a coordinator or sub-coordinator crashes. Further, in accordance with specific embodiments, at least some of the information used to generate a token is only known by the creator of the token. For example, at least some of the information used to generate a CToken is only known by the coordinator generating the CToken; and at least some of the information used to generate an SToken is only known by the sub-coordinator generating the SToken.

Generation of Tokens

In one embodiment, a CToken can be generated by encrypting a transaction identifier (XID) and/or other information defined by the coordinator with some unique information known only by the coordinator. Similarly, an SToken can be generated by encrypting a transaction identifier (XID) and/or other information defined by the sub-coordinator with some unique information only known by the sub-coordinator. The use of symmetric encryption algorithms provides for a strong authentication of the tokens. Other possibilities for generating CTokens and STokens are also within the scope of the present invention.

In another embodiment, a cryptographic hash (e.g., a keyed-hash message authentication code (HMAC)) can be used to generate a unique digital signature based on some unique information known only by the creator of the token. The use of cryptographic hash functions is more efficient from a performance perspective than the use of encryption algorithms. In a specific embodiment, a token can be generated using a cryptographic hash of the unique information that is only valid to a server or a cluster (or the entire domain). The scope of a token would be determined by this unique information. For example, if an SToken is used within a cluster, then it could include information unique to the cluster (e.g., the cluster name) so that any server (or sub-coordinator) in the cluster should be able to regenerate the SToken.

In accordance with specific embodiments, CTokens are only valid for a certain period of time. A coordinator can compute the CToken using information unique to that coordinator. Preferably, the coordinator should be able to re-create the CToken after a crash. Each coordinator creates and manages its own tokens. However, if the server fails and the coordinator is migrated to another server in the cluster, the new coordinator should be able to process the tokens generated by the old coordinator. If transaction coordination is migrated to another server in the same cluster as the original coordinator, the new coordinator should be able to accept the CTokens generated by the original coordinator. Preferably, a sub-coordinator stores a CToken (e.g., within its checkpoint record), so that the sub-coordinator will have access to the CToken if the application server hosted by the sub-coordinator crashes and needs to recover.

One goal of the TCP Phase is for a coordinator and a sub-coordinator to exchange tokens with the transaction propagation context (TPC). As mentioned above, the tokens are exchanged assuming an implicit trust between the coordinator and the sub-coordinator. For example, when the application 122 of application server 120 sends a transactional request to the application 142 of the application server 140, the transactional request message includes the TPC, which, as mentioned above, includes the XID and CToken, and possibly some additional information, such as coordinator information. The transactional request message that includes the TPC may be referred to hereafter as a TPC-REQ. In accordance with an embodiment, it is the coordinator that includes the CToken in the TPC-REQ. The coordinator may also include a nonce (random value) in the TPC-REQ.

Thereafter, the application 142 of the application server 140 can send a transactional reply (also known as a response message) to the application 122 of the application server 120, which in addition to including the XID and the CToken (and possibly other information), will also include the SToken. This information is carried in the TPC carried with the transactional reply. This TPC does not need to include the CToken; including the nonce would show that the callee received the CToken. This also reduces token transfers over the network. The TPC may have different information and/or additional information to the information carried from the caller to the callee, so the transactional reply message that includes the TPC (with the SToken) may be referred to hereafter as a TPC-RSP in order to stress this distinction. In accordance with an embodiment, it is the sub-coordinator that adds the SToken to the TPC-RSP. In accordance with an embodiment, where the coordinator included a nonce in the TPC-REQ, the sub-coordinator will include that nonce value in the TPC-RSP. In accordance with an embodiment, the SToken and/or the nonce can be encrypted using the CToken, to add further protection. However, this encryption operation is not necessary because of the assumption that the TPC flows over a secure connection.

It is also within the scope of the present invention that the application 142 on application server 140 (of Domain 2) can make a transactional request and receive a transactional reply from still another application 162 of another application server 160 (of Domain 3), before the application 142 of the application server 140 (of Domain 2) makes the transactional reply to the application 122 of the application server 120 (of Domain 1). When this occurs, the TPC-REQ sent from Domain 2 to Domain 3 should include the CToken and the nonce provided by the coordinator of Domain 1. The sub-coordinator 174 of Domain 3 will compute its own SToken and include its SToken in the TPC-RSP that is sent from Domain 3 to Domain 2. Thereafter, when a TPC-RSP is sent from Domain 2 to Domain 1, the TPC-RSP will include the SToken(D2) computed by the sub-coordinator of Domain 2 as well as the SToken(D3) computed by the sub-coordinator of Domain 3. Eventually, the coordinator in Domain 1 will obtain an SToken from each sub-coordinator involved in a transaction, enabling the coordinator to coordinate the transaction directly with the sub-coordinators. This is an example of the "flattening of the transaction coordination tree."

Figure 2A:
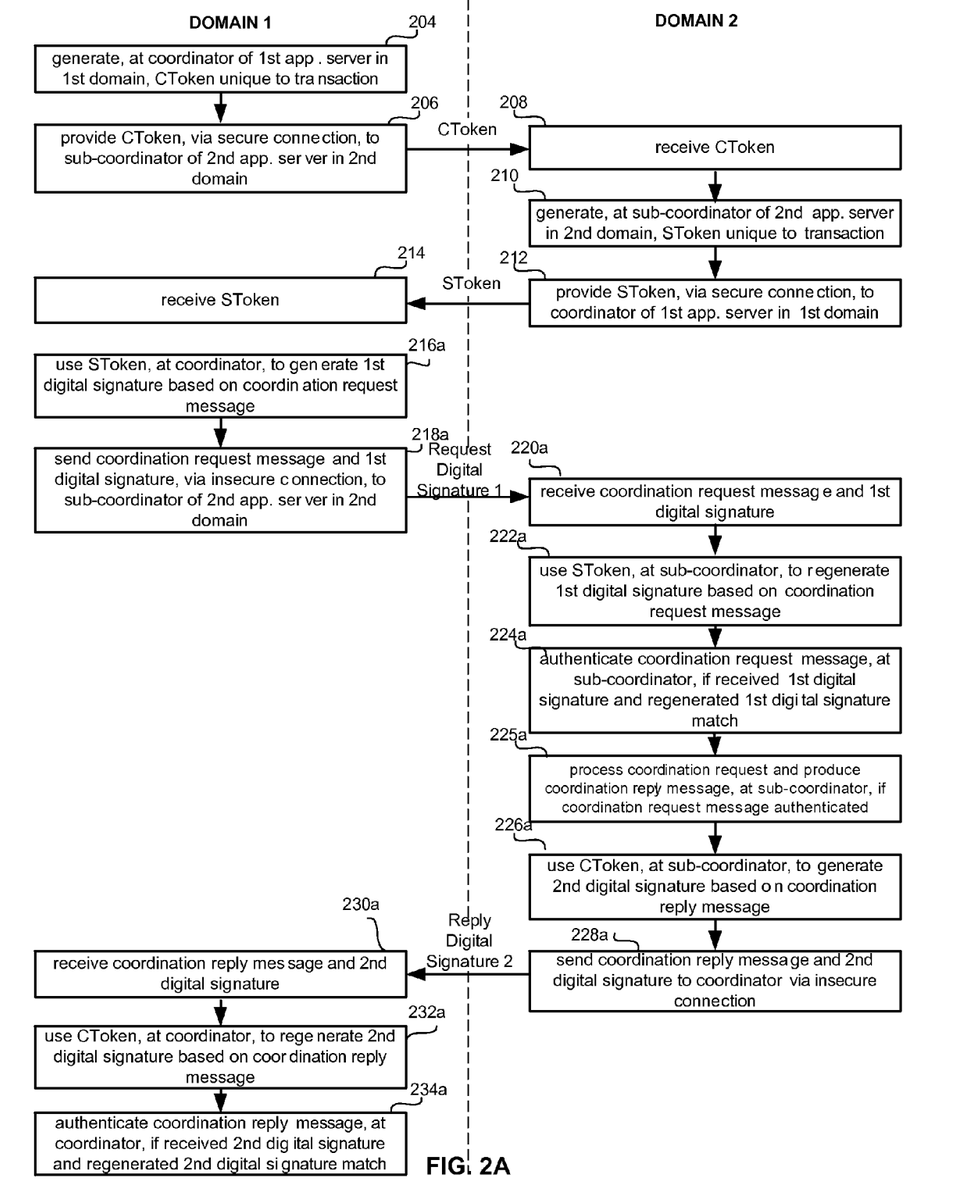
FIGS. 2A-2D are high level diagrams that are useful for explaining how transaction coordination messages sent via insecure connections can be authenticated, in accordance with various embodiments of the present invention.

The TCP phase will now be summarized with reference to the exemplary system diagram of FIG. 1 and steps 204-214 of the high level flow diagram of FIG. 2A. Referring to FIG. 2A, at step 204, a coordinator (e.g., 134) hosted by a first application server (e.g., 120) within a first domain (e.g., Domain 1) generates a CToken that is unique to a transaction. Exemplary details relating to generating a CToken are discussed above. At step 206, the CToken is provided via a trusted connection to a sub-coordinator (e.g., 154) hosted by a second application server (e.g., 140) within a second domain (e.g., Domain 2). At step 208, the CToken is received by the sub-coordinator. At step 210 the sub-coordinator generates an SToken that is unique to the transaction. Exemplary details regarding generating an SToken are discussed above. At step 212, the SToken is provided via a trusted connection to the coordinator. At step 214, the SToken is received by the coordinator.

As will be described in more detail below, a Transaction Coordination and Recovery (TCR) phase follows the TCP phase. The TCR phase starts when the application commits or rolls back the transaction. During the TCR phase, the CToken and the SToken are used to authenticate transaction coordination messages that are sent over insecure connections. As will be described below, there are various different algorithms for the TCR phase, some of which rely on digital signatures for authentication, others of which rely on encryption. In one embodiment, the coordinator and sub-coordinator(s) always use the same algorithm during the TCR phase. In other embodiments, the coordinator can select which algorithm it will use (from a plurality of algorithms), and thereafter negotiate with the sub-coordinator as to whether the sub-coordinator can support the algorithm. This negotiation can happen during the TCP phase when tokens are being exchanged. For example, the coordinator can suggest an algorithm and the sub-coordinator can accept or rejects the suggested algorithm as a part of the exchange. In one embodiment, if the sub-coordinator rejects the algorithm suggested by the coordinator, then an SToken is not sent back to the coordinator because the sub-coordinator will not be able to enroll for coordination. A rejection from the sub-coordinator is treated as a failure, and the coordinator will not proceed to the TCR phase with this sub-coordinator.

Transaction Coordination and Recovery (TCR) Phase

Once a coordinator and one or more sub-coordinators have exchanged tokens via an implicitly trusted application call connection during the TCP phase, as described above, the coordinator and sub-coordinator(s) are ready to exchange transaction coordination messages over an insecure connection that is controlled by the transaction sub-systems during the TCR phase, as described below. An insecure connection can be, e.g., a connection that is lacking SSL or TLS type security. Such transaction coordination messages can be, e.g., to commit, rollback (also known as abort) or recover a transaction.

The TCR phase can be thought of as including a transaction coordination phase, and/or a transaction recovery phase, each of which is described below. As will be described below, during the transaction coordination phase, the tokens are used to authenticate the transaction coordination messages over the insecure connection. As will also be described below, during the transaction recovery phase, the tokens are used for transaction recovery following a failure.

Transaction Coordination

In accordance with specific embodiments of the present invention, when a coordinator (e.g., 134) sends a transaction coordination request to a sub-coordinator(s) (e.g., 154), the coordinator also sends information that allows the sub-coordinator(s) to authenticate the coordinator. A transaction coordination request can also be referred to as a coordination request or a coordination message. In one embodiment, a coordinator uses an algorithm (e.g., a hash function) that uses a sub-coordinator's SToken to produce a digital signature of a coordination request, and the coordinator provides the digital signature with the coordination request. In another embodiment, the coordinator encrypts the coordination request using the SToken.

As mentioned above, there is no requirement that a sub-coordinator store a coordinator's CToken. In one embodiment, the use of the "checkpoint record" improves the response to resolving in-doubt transactions when a sub-coordinator application server fails. By retrieving the CToken from the checkpoint record, the sub-coordinator can request a status check to the coordinator. The coordinator can authenticate that the status check is from an authentic sub-coordinator and for the right transaction. This mechanism is also tied to the "validity period"; the validity period extends the life of a Ctoken to control edge conditions during recovery. Accordingly, the coordinator can also provide the CToken with each transaction coordination request, e.g., as an ecrypted parameter of the transaction coordination request. (However, as described below, a sub-coordinator may store a coordinator's CToken, e.g., in the sub-coordinator's Checkpoint Record). Where the coordinator includes a digital signature with a transaction coordination request, the coordinator can encrypt the CToken (e.g., using the SToken), so that the CToken is not compromised over the insecure connection. Where the coordinator encrypts the transaction coordination request using the SToken, the coordinator can also encrypt the coordinator's CToken using the SToken.

When a sub-coordinator receives the coordination request from a coordinator, if a digital signature is provided with the coordination request, the sub-coordinator regenerates the digital signature using the same algorithm used by the coordinator. This way, the sub-coordinator can compare the regenerated digital signature to the digital signature received from the coordinator. If the digital signatures match, the sub-coordinator considers the request authentic and the request is accepted and processed by the sub-coordinator. Additionally, where the coordinator also sent an encrypted CToken with the coordination request, the sub-coordinator uses its SToken to decrypt the CToken.

If a sub-coordinator receives an encrypted coordination request message from a coordinator, the sub-coordinator decrypts the encrypted coordination request message using the sub-coordinator's SToken. Where an encrypted CToken is provided with the encrypted coordination request, the sub-coordinator can also decrypt CToken.

Once a sub-coordinator has obtained the coordination request, and authenticated it, the sub-coordinator processes the coordination request and produces a coordination reply message. In similar manners as described above, the sub-coordinator can convey the coordination reply to the coordinator. More specifically, the sub-coordinator can use an algorithm (e.g., a cryptographic hash function) that uses the sub-coordinator's SToken (or the coordinator's CToken) to produce a digital signature of a coordination reply, and the coordinator provides the digital signature with the coordination reply. In another embodiment, the coordinator encrypts the coordination request using the SToken (or the coordinator's CToken).

When the coordinator receives the coordination reply from a sub-coordinator, if a digital signature is provided with the coordination reply, the coordinator regenerates the digital signature using the same algorithm used by the sub-coordinator. This way, the coordinator can compare the regenerated digital signature to the digital signature received from the sub-coordinator. If the digital signatures match, the coordinator considers the reply authentic and the reply is accepted by the coordinator.

If a coordinator receives an encrypted coordination reply from a sub-coordinator, the coordinator decrypts the encrypted coordination reply using the sub-coordinator's SToken (or the coordinator's CToken, depending upon the embodiment).

Figure 2B:
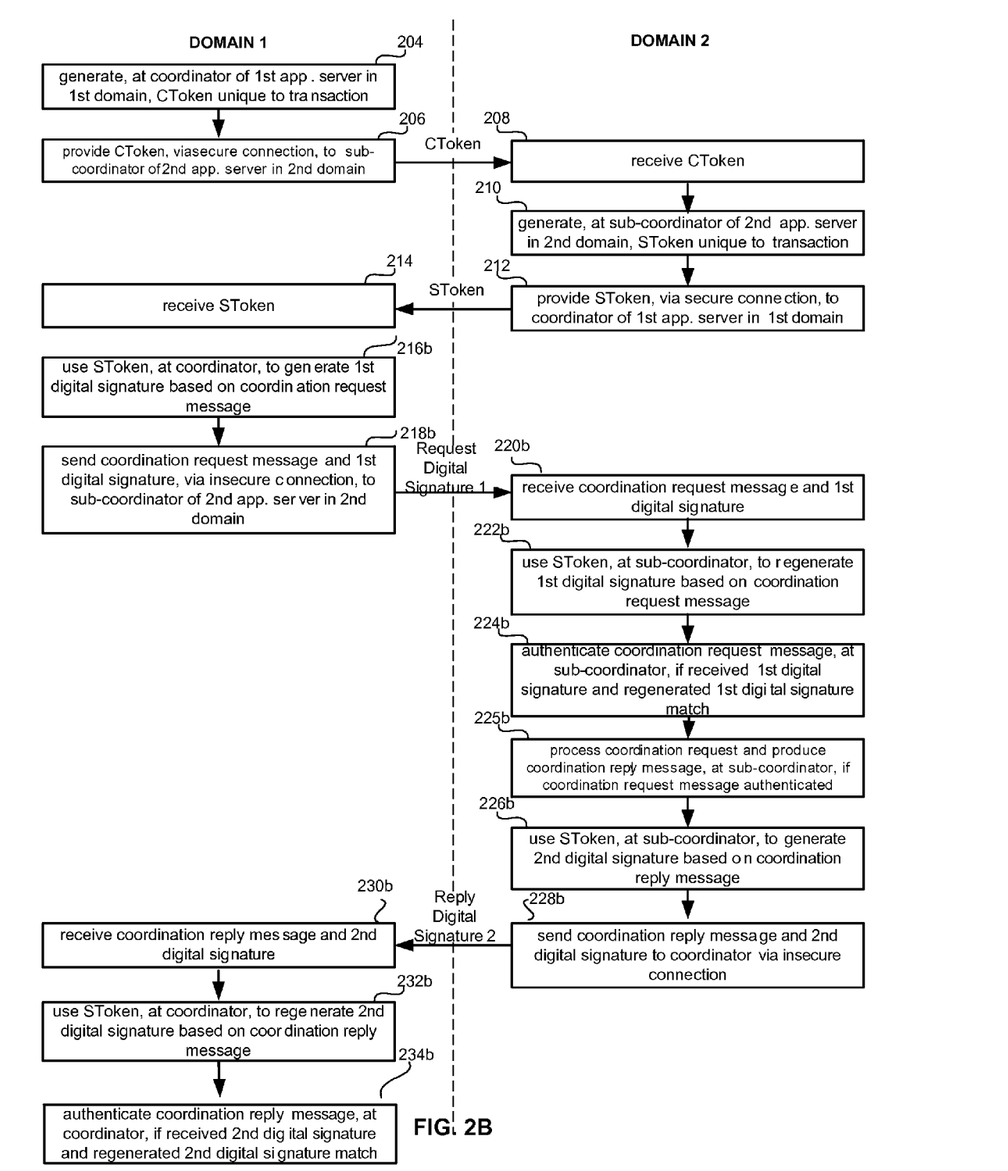
Figure 2C:
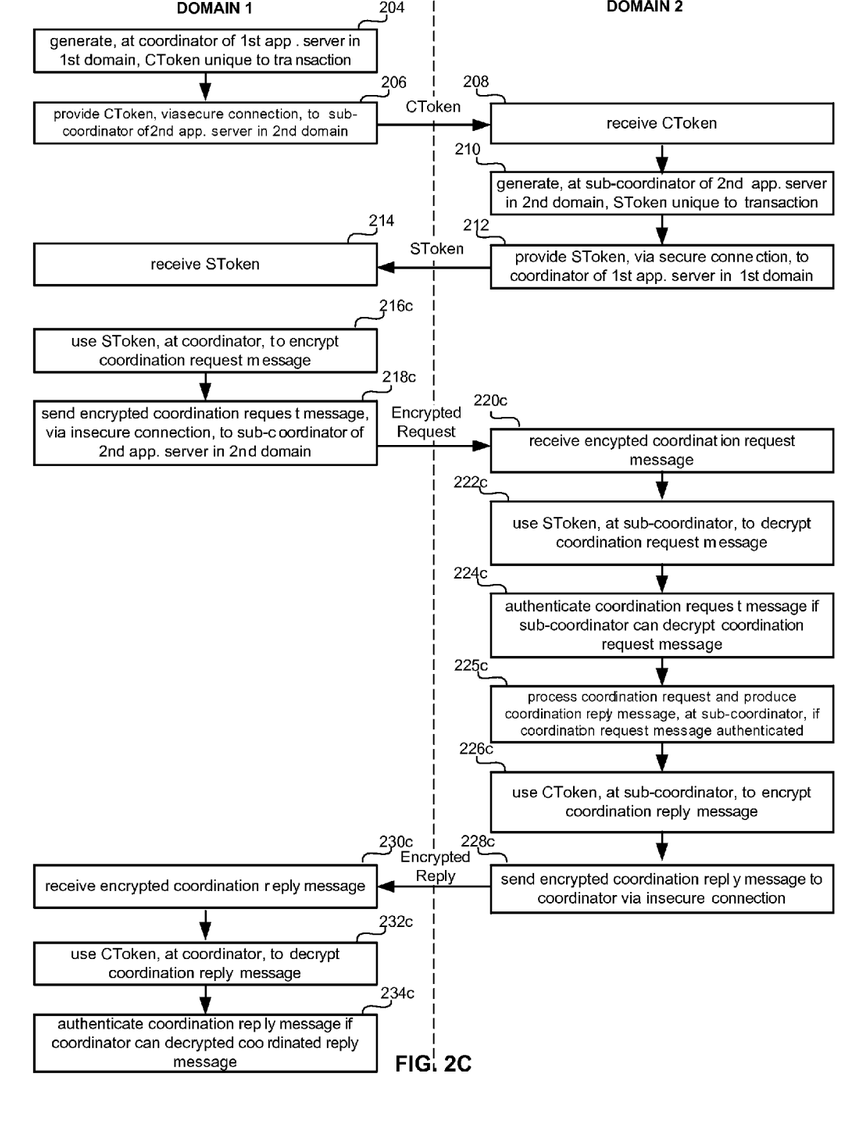
Figure 2D:
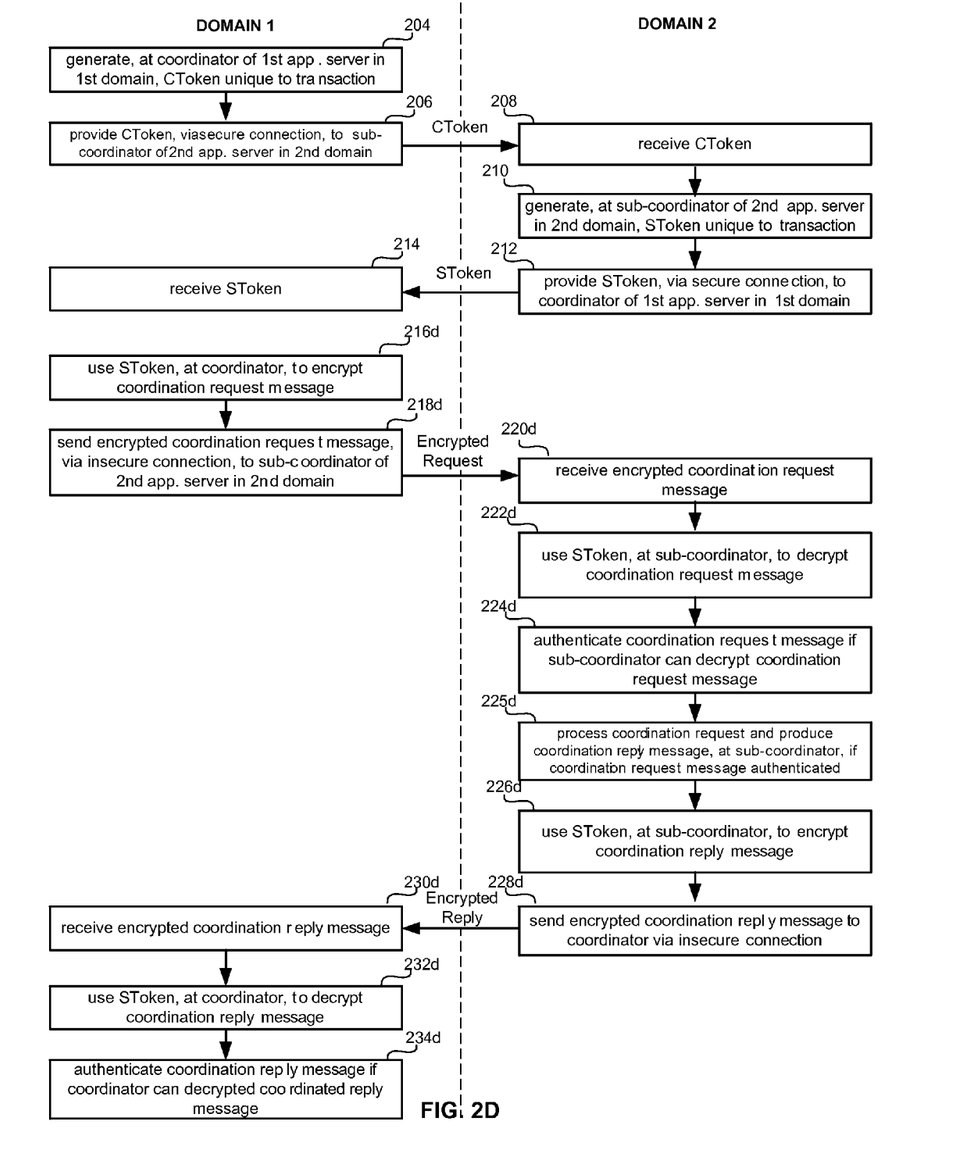

The various embodiments of the transaction coordination phase introduced above will now be summarized with reference to steps 216a-234a of FIG. 2A, steps 216b-234b of FIG. 2B, steps 216c-234c of FIG. 2C, and steps 216d-234d of FIG. 2D. In each of these figures, steps 204-214 of the TCP phase are the same, and thus need not be described again.

FIGS. 2A and 2B are first used to summarize the embodiments where digital signatures generated using tokens are included with coordination messages. Referring to FIG. 2A, at step 216a, the coordinator (e.g., 134) generates a digital signature based on a coordination request message. Details of how the coordinator can produce the digital signature (referred to in FIG. 2A as the first digital signature) are discussed above. At step 218a the coordination request message and the digital signature are provided, via an insecure connection, to the sub-coordinator (e.g., 154) of the application server of the second domain. As explained above, the CToken, encrypted using the SToken, can also be sent with the request. At step 220a, the coordination request message and the digital signature are received by the sub-coordinator. At step 222a, the sub-coordinator uses its SToken to regenerate the digital signature. At step 224a, the coordinator compares the received digital signature and the regenerated digital signature, and authenticates the coordination request message if the received digital signature and the regenerated digital signature match.

If the received digital signature and the regenerated digital signature do not match, the coordination request message is not authenticated. The sub-coordinator can ignore and/or reject the message and eventually the coordinator may resolve the transaction state (e.g., abort it) using other mechanisms (e.g., timeout). A rejection from the sub-coordinator is treated as a failure.

If the coordination request is authenticated, then the coordination request is processed and a coordination reply message is produced, at step 225a. At step 226a, the sub-coordinator uses the CToken to generate a second digital signature (referred to in FIG. 2A as the second digital signature) based on the coordination reply message. The sub-coordinator knows the CToken because it stored/cached the CToken it received at step 208a, or because it decrypted an encrypted CToken received at step 220a. At step 228a, the coordination reply message and the second digital signature are provided to the coordinator via an insecure connection. This can be the same insecure connection referred to at step 218a, or a different insecure connection.

At step 230a, the coordinator receives the coordination reply message and the second digital signature. At step 232a, the coordinator regenerates the second digital signature using the CToken. At step 234a, the coordinator authenticates the coordination reply message if the second digital signature and the regenerated second digital signature match. If they don't match, the coordination reply message is not authenticated.

Referring to FIG. 2B, steps 216b-222b are the same as steps 216a-225a, and thus need not be described again. Step 226b differs from step 226a, in that at step 226b it is the SToken (as opposed to the CToken) that is used to generate the second digital signature based on the coordination reply message. Further, at step 232b it is the SToken (as opposed to the CToken) that is used to regenerate the second digital signature.

FIGS. 2C and 2D are used to summarize the embodiments where coordination messages are encrypted using the tokens. Referring to FIG. 2C, at step 216c, the coordinator uses the SToken to encrypt a coordination request message. At step 218c, the encrypted coordination request message is provided, via an insecure connection, to the sub-coordinator (e.g., 154) of the application server of the second domain. As explained above, the CToken, encrypted using the SToken, can also be sent with the request. At step 220c, the sub-coordinator receives the encrypted coordination request message. At step 222c, the sub-coordinator uses its SToken to decrypt the coordination request message. At step 224c, the coordination request message is considered authenticated if the sub-coordinator was able to decrypt the coordination request message.

If the sub-coordinator cannot successfully decrypt the coordination request message, then the coordination request message is not authenticated. The sub-coordinator can thereafter either not send a transactional reply message to the coordinator and thus ignore the request, or the sub-coordinator can send a transactional reply message to the coordinator indicating that the coordination request has been rejected. A rejection from the sub-coordinator is treated as a failure.

If the coordination request is authenticated, then the coordination request is processed and a coordination reply message is produced, at step 225c. At step 226c, the sub-coordinator uses the CToken to encrypt the coordination reply message. The sub-coordinator knows the CToken because it stored/cached the CToken it received at step 208c, or because it decrypted an encrypted CToken received at step 222c. At step 228c, the encrypted coordination reply message is provided to the coordinator via an insecure connection. This can be the same insecure connection referred to at step 218c, or a different insecure connection.

At step 230c, the coordinator receives the encrypted coordination reply message. At step 232c, the CToken is used to decrypt the coordination reply message. At step 234c, the coordination reply message is considered authenticated if the coordinator was able to decrypt the coordination reply message.

Referring to FIG. 2D, steps 216d-225d are the same as steps 216c-225c, and thus need not be described again. Step 226d differs from step 226c, in that at step 226d it is the SToken (as opposed to the CToken) that is used to encrypt the coordination reply message. Further, at step 232d it is the SToken (as opposed to the CToken) that is used to decrypt the coordination reply message.

Transaction Recovery

A failure can occur during the transaction context propagation (TCP) phase, as well as during the Transaction Coordination phase. Such a failure can occur, e.g., due to a loss of a network connection between a coordinator and a sub-coordinator. A failure may also occur if the application server (e.g., a Java Virtual Machine or host machine) hosting a coordinator or sub-coordinator crashes. Various mechanisms, as described below, can be used for transaction recovery.

Timeout Mechanisms

Transaction timeout is a fundamental feature used in distributed transaction processing to resolve long wait conditions produced by deadlocks or a failure condition. Three types of timeout mechanisms are discussed below.

TransactionTimeout. A programmer, or a system administrator, can assign a timeout value to transactions. This timeout value specifies the time after which a transaction can be rolled back. When this maximum time is reached, the transaction is automatically rolled back and the programmer is informed via an exception on the next transactional call to an object or when the application tries to commit. This timeout does not apply when a transaction moves into the commit phase (i.e., the commit log record has been written by the coordinator).

XATransactionTimeout. XA Resource managers (e.g., a database management system (DBMS)) typically connect with a transaction subsystem via a network connection. Some XA resource managers allow administrators to define a transaction timeout on a transaction branch. By default, an application server sets this time, when the transaction branch is created, to the value of the remaining timeout value for the whole transaction. However, administrators can provide another value. If a value is set for XATransactionTimeout, then the XA Resource manager is authorized to rollback the corresponding transaction branch when the time allowed expires and the transaction is still "active." This timeout value is not valid when the transaction branch has been prepared. Furthermore, this artifact would not always be available to resolve recovery situations involving prepared transactions because it may not be available on all Resources Managers involved in the application.

TransactionAbandonTimeout. Once a transaction moves into the second phase of commitment, the transaction manager will keep retrying the commit operation (e.g., every 5 seconds) on sub-coordinators that have not yet replied to this operation. By default, the application keeps trying (e.g., for 24 hours), but administrators can reset this default by assigning another value to the Transaction Abandon Timeout. When the time specified by this timeout expires, the transaction subsystem logs a message indicating that the commitment has been abandoned for that transaction.

Transaction Logs and Checkpoint Records

Each transaction subsystem has (or at least has access to) a transaction log to capture information about transactions that have been committed, as well as those that may not have completed. Such a transaction log enables a transaction subsystem to recover transactions that were not completed prior to failure of the application server that hosts the transaction subsystem. A recovery procedure can be executed when an application server is restarted after a failure. One part of the procedure can involve a transaction subsystem inspecting a transaction log and trying to complete those transactions that have not yet completed.

A transaction subsystem (e.g. 132) can write a log record to its transaction log (e.g. 170) when a transaction moves into the second phase of commitment. Preferably, this log record includes all the information necessary to complete the transaction that may be in a prepared state at other application servers. Only the coordinator need write this type of log record.

In accordance with an embodiment, a coordinator keeps a record of all the STokens returned by all of the sub-coordinators. For example, referring to FIG. 1, in accordance with an embodiment, this information (i.e., the SToken information) is added to the transaction's commitment log record stored in the transaction log 170.

In accordance with an embodiment, each transaction subsystem has (or at least has access to) an associated checkpoint record within their transaction log. The transaction subsystem uses a checkpoint mechanism to keep a record of coordinators (including sub-coordinators) and resources that have been involved in transactions for the last 24 hours, or other period of time. This information is stored in checkpoint records within the transaction log. A coordinator can use the checkpoint record to re-construct a list of sub-coordinators and resources that have been involved with the coordinator and may need to be queried for recovery information.

In accordance with an embodiment, a sub-coordinator stores a CToken, e.g., in their checkpoint records. For example, referring to FIG. 1, the sub-coordinator 154 has access to checkpoint records 159 within its transaction log 180, and the sub-coordinator 174 has access to checkpoint records 179 within its transaction log 190. Additionally and/or alternatively, a sub-coordinator can cache their SToken (and other STokens) and the CToken for the duration of a transaction, to improve performance. If a sub-coordinator is involved in multiple transactions, controlled by multiple coordinators, the sub-coordinator can store and/or cache multiple CTokens.

Coordination Migration

As mentioned above, in accordance with specific embodiments of the present invention, application server administrators have the capability to migrate explicitly a coordinator from one server in a cluster to another server in the same cluster. Servers within the same cluster are within the same domain. Upon migration, a coordinator can run a recovery to complete any pending transactions.

Using a Token to Protect Recovery Calls

As explained above, a CToken can be used to provide additional protection for the replies from a sub-coordinator to a coordinator. As mentioned above, in certain embodiments the algorithm is simplified by using only STokens to protect commitment exchanges (i.e., prepare, commit, rollback and their corresponding acknowledgment messages) without compromising the security of these exchanges. Below, a variation of the use of the CToken is proposed to protect recovery exchanges.

The following mechanism can be used to prevent replays and authenticate recovery exchanges. This mechanism is a variation of the CToken artifact proposed above.

1. The coordinator generates CTokens and shares them with sub-coordinators during the secure transaction propagation phase.

2. A CToken is not tied to a transaction, but rather has a validity period (e.g., a day). In the case of a crash, a coordinator can re-generate a CToken consistently for a particular validity period.

3. Sub-coordinators will write the CToken in their checkpoint records, but only when the CToken changes. If a sub-coordinator crashes, it can retrieve a copy of a coordinator's CToken from its last checkpoint record.

4. Recovery methods can be modified to add new parameters to control replay and optionally authenticate the caller with a digital signature.

5. The CToken can be used to encrypt the recovery message or to sign that message.

Alternative Use and Generation of STokens and CTokens

In accordance with a specific embodiment, the algorithm for the creation of STokens enables multiple sub-coordinators to have access to the same resource. In this case, the SToken will be valid for these sub-coordinators. STokens are only valid for the duration of a transaction and only sub-coordinators generate these tokens. If a transaction has been completed, the SToken is not valid. An SToken can be generated using a cryptographic hash of the XID and other unique information that is only valid to an application server or a cluster (or the entire domain). The scope of the SToken would be determined by this unique information. For example, if the SToken is used within a cluster, then it could include information unique to that cluster (e.g., the cluster name).

In accordance with an embodiment, sub-coordinators that share a resource manager can generate STokens that are usable by any of these sub-coordinators.

CTokens can be valid for a certain time period. A coordinator can compute the token using information such as the coordinator ID, the validity period, and other information unique to that coordinator. The coordinator can be able to re-create the CToken after a crash. CTokens can also be scoped to allow coordination migration to another server in a cluster. Sub-coordinators should store CTokens with their checkpoint records to ensure that they will have a token for recovery.

Administrative Operations

A transaction subsystem allows administrators to force the termination (rollback or commit) of a particular transaction. Administrators typically use these operations when they cannot restart the server hosting a coordinator and they want to resolve a particular transaction to release resources (e.g., locks). In theory, an administrator using the console, scripts (e.g., WebLogic Scripting Tool (WLST)), or an administrative program executes these methods via corresponding operations in the Transaction MBeans interface. The MBeans interface checks via the WLS security subsystem whether the calling user is allowed or not allowed to execute these operations. Note that the coordinator and the sub-coordinator objects can provide the actual methods that perform these operations.

While embodiments of the present invention are especially useful for enabling authentication of transaction coordination messages sent via one or more insecure connection(s) between multiple domains, these embodiments are also useful for enabling authentication of transaction coordination messages sent via insecure connection(s) within the same domain. While FIGS. 1 and 2A through 2D show embodiments sending messages between domains, embodiments within a single domain can be visualized by removing the dashed vertical line so that all of the components are in the same domain.

Embodiments of the present invention can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method for enabling a coordinator hosted by a first application server to exchange transaction coordination messages over one or more insecure connections with a sub-coordinator hosted by a second application server, for use in performing a transaction, the method comprising:
    (a) generating a coordinator token by the coordinator at the first application server;
    (b) sending, over one or more secure connections, the coordinator token to the sub-coordinator at the second application server;
    (c) generating a sub-coordinator token by the sub-coordinator at the second application server;
    (d) receiving, at the coordinator on the first application server, over the one or more secure connections, the sub-coordinator token from the sub-coordinator;
    (e) generating, by the coordinator using the sub-coordinator token, a first digital signature based on a transaction coordination request message;
    (f) sending, by the coordinator over one or more insecure connections, the transaction coordination request message and the first digital signature to the sub-coordinator, whereby the first digital signature enables the sub-coordinator to authenticate the transaction coordination request message;
    (g) receiving, at the coordinator, over the one or more insecure connections, a transaction coordination reply message and a second digital signature from the sub-coordinator, wherein the transaction coordination reply message and the second digital signature are received after the transaction coordination request message is authenticated by the sub-coordinator;
    (h) regenerating the second digital signature, by the coordinator using one of the coordinator token and the sub-coordinator token, based on the transaction coordination reply message; and
    (i) determining, by the coordinator, that the second digital signature and the regenerated second digital signature match, and authenticating the transaction coordination reply message.

2. The method of claim 1, wherein step (h) comprises using the coordinator token to regenerate the second digital signature based on the transaction coordination reply message.

3. The method of claim 1, wherein step (h) comprises using the sub-coordinator token to regenerate the second digital signature based on the transaction coordination reply message.

4. The method of claim 1, wherein the coordinator token generated at step (a) is unique to the transaction.

5. The method of claim 1, wherein the coordinator token generated at step (a) has a period of validity and can be used for multiple transactions that occur within the period of validity.

6. The method of claim 1, further comprising regenerating the coordinator token if the application server hosting the coordinator crashes before the transaction is completed.

7. The method of claim 1, storing the sub-coordinator token so that the coordinator can retrieve the sub-coordinator token if the server hosting the coordinator crashes before the transaction is completed.

8. The method of claim 1, further comprising:
    specifying, to the sub-coordinator, an authentication algorithm to be used; and
    interpreting not receiving a sub-coordinator token from the sub-coordinator, following the sending of the coordinator token at step (b), as an indication that the sub-coordinator cannot support the specified algorithm.

9. The method of claim 1, wherein the application server hosting the coordinator is in a first domain and the second application server hosting the sub-coordinator is in a second domain.

10. The method of claim 1, wherein the application server hosting the coordinator is in a first domain and the second application server hosting the sub-coordinator is also in the first domain.

11. A non-transitory computer readable medium including instructions stored thereon which when executed cause an application server to perform the steps of:
    generating a coordinator token by the coordinator at a first application server;
    sending, over one or more secure connections, the coordinator token to a sub-coordinator hosted by a second application server;
    generating a sub-coordinator token by the sub-coordinator at the second application server;
    receiving, at the coordinator on the first application server, over the one or more secure connections, the sub-coordinator token from the sub-coordinator;
    generating, by the coordinator using the sub-coordinator token, a first digital signature based on a transaction coordination request message;
    sending, by the coordinator over one or more insecure connections, the transaction coordination request message and the first digital signature to the sub-coordinator, whereby the first digital signature enables the sub-coordinator to authenticate the transaction coordination request message; and
    receiving, at the coordinator over the one or more insecure connections, a transaction coordination reply message and a second digital signature from the sub-coordinator, wherein the transaction coordination reply message and the second digital signature are received after the transaction coordination request message is authenticated by the sub-coordinator;
    regenerating the second digital signature, by the coordinator, using one of the coordinator token and the sub-coordinator token, based on the transaction coordination reply message; and
    determining, by the coordinator, that the second digital signature and the regenerated second digital signature match, and authenticating the transaction coordination reply message.

12. A method for enabling a coordinator hosted by a first application server to exchange transaction coordination messages over one or more insecure connections with a sub-coordinator hosted by a second application server, the transaction coordination messages for use in performing a transaction, the method comprising:
    (a) generating a coordinator token by the coordinator at the first application server;

(b) sending the coordinator token to the sub-coordinator at the second application server over a secure connection;

(c) generating a sub-coordinator token by the sub-coordinator at the second application server;

(d) receiving, at the coordinator on the first application server, over the secure connection, the sub-coordinator token from the sub-coordinator over a secure connection, wherein the sub-coordinator token is generated by the sub-coordinator;

(e) encrypting, by the coordinator, transaction coordination request message, using the sub-coordinator token;

(f) sending, by the coordinator over the secure connection, the encrypted transaction coordination request message to the sub-coordinator over an insecure connection;

(g) receiving, at the coordinator, an encrypted transaction coordination reply message from the sub-coordinator over the insecure connection;

(h) decrypting, by the coordinator, the encrypted transaction coordination reply message using one of the coordinator token and the sub-coordinator token; and (i) authenticating, by the coordinator, the transaction coordination reply message.

13. The method of claim 12, wherein step (h) comprises decrypting the encrypted transaction coordination reply message using the coordinator token.

14. The method of claim 12, wherein step (h) comprises decrypting the encrypted transaction coordination reply message using the sub-coordinator token.

15. The method of claim 12, wherein the coordinator token generated at step (a) is unique to the transaction.

16. The method of claim 12, wherein the coordinator token generated at step (a) has a period of validity and can be used for multiple transactions that occur within the period of validity.

17. The method of claim 12, further comprising regenerating the coordinator token if the application server hosting the coordinator crashes before the transaction is completed.

18. The method of claim 12, storing the sub-coordinator token so that the coordinator can retrieve the sub-coordinator token if the server hosting the coordinator crashes before the transaction is completed.

19. The method of claim 12, further comprising:
specifying, to the sub-coordinator, an authentication algorithm to be used; and
interpreting not receiving a sub-coordinator token from the sub-coordinator, following the sending of the coordinator token at step (b), as an indication that the sub-coordinator cannot support the specified algorithm.

20. The method of claim 12, wherein the application server hosting the coordinator is in a first domain and the second application server hosting the sub-coordinator is in a second domain.

21. The method of claim 12, wherein the first application server hosting the coordinator is in a first domain and the second application server hosting the sub-coordinator is also in the first domain.

22. A non-transitory computer readable medium including instructions stored thereon which when executed cause an application server to perform the steps of:
generating a coordinator token by a coordinator at a first application server;
sending, over one or more secure connections, the coordinator token to a sub-coordinator hosted by a second application server;
generating, by the sub-coordinator at the second application server, a sub-coordinator token;
receiving, at the coordinator, over the one or more secure connections, the sub-coordinator token from the sub-coordinator;
encrypting, by the coordinator, a transaction coordination request message, using the sub-coordinator token;
sending, by the coordinator, the encrypted transaction coordination request message to the sub-coordinator over an insecure connection;
receiving, by the coordinator, an encrypted transaction coordination reply message from the sub-coordinator over the insecure connection;
decrypting, by the coordinator, the encrypted transaction coordination reply message using one of the coordinator token and the sub-coordinator token; and
after successfully decrypting the encrypted transaction coordinator reply message, authenticating, by the coordinator, the transaction coordination reply message.

23. A method for enabling a coordinator hosted by an application server to exchange transaction coordination messages over one or more insecure connections with a sub-coordinator hosted by a second application server, the transaction coordination messages for use in performing a transaction, the method comprising:

(a) performing an exchange between the coordinator and the sub-coordinator, such that the coordinator provides the sub-coordinator with a coordinator token, and the sub-coordinator provides the coordinator with a sub-coordinator token over one or more secure connections between the coordinator and the sub-coordinator; and (b) using the coordinator and sub-coordinator tokens to authenticate transaction coordination messages sent over one or more insecure connections between the coordinator and the sub-coordinator.

24. The method of claim 23, wherein step (a) includes:
(a.1) generating the coordinator token at the coordinator;
(a.2) sending the coordinator token from the coordinator to the sub-coordinator;
(a.3) generating the sub-coordinator token at the sub-coordinator; and
(a.4) sending the sub-coordinator token from the sub-coordinator to the coordinator.

25. The method of claim 23, wherein step (b) includes:
(b.1) using the sub-coordinator token, at the coordinator, to generate a first digital signature based on a transaction coordination request message;
(b.2) sending the transaction coordination request message and the first digital signature from the coordinator to the sub-coordinator over an insecure connection;
(b.3) using the sub-coordinator token, at the sub-coordinator, to regenerate the first digital signature; and
(b.4) authenticating the transaction coordination request message, at the sub-coordinator, if the first digital signature received from the coordinator and the regenerated first digital signature match.

26. The method of claim 25, wherein step (b) further includes the following, if the sub-coordinator authenticated the transaction coordination request message:
(b.5) producing a transaction coordination reply message;
(b.6) using one of the coordinator token and the sub-coordinator token, at the sub-coordinator, to generate a second digital signature based on the transaction coordination reply message;
(b.7) sending the transaction coordination reply message and the second digital signature from the sub-coordinator to the coordinator, over an insecure connection;

(b.8) using the one of the coordinator token and the sub-coordinator token, at the coordinator, to regenerate the second digital signature; and (b.9) authenticating the transaction coordination reply message, at the coordinator, if the second digital signature received from the sub-coordinator and the regenerated second digital signature match.

27. The method of claim 23, wherein step (b) includes:

(b.1) using the sub-coordinator token, at the coordinator, to encrypt a transaction coordination request message;

(b.2) sending the encrypted transaction coordination request message from the coordinator to the sub-coordinator over an insecure connection;

(b.3) using the sub-coordinator token, at the sub-coordinator, to decrypt the encrypted transaction coordination request message; and (b.4) authenticating the transaction coordination request message, at the sub-coordinator, if the transaction coordination request message is successfully decrypted by the sub-coordinator.

28. The method of claim 27, wherein step (b) further includes the following, if the sub-coordinator authenticated the transaction coordination request message:

(b.5) producing a transaction coordination reply message;

(b.6) using one of the coordinator token and the sub-coordinator token, at the sub-coordinator, to encrypt the transaction coordination reply message;

(b.7) sending the encrypted transaction coordination reply message from the sub-coordinator to the coordinator, over an insecure connection;

(b.8) using the one of the coordinator token and the sub-coordinator token, at the coordinator, to decrypt the encrypted transaction coordination reply message; and (b.9) authenticating the transaction coordination reply message, at the coordinator, if the transaction coordination reply message is successfully decrypted by the coordinator.

29. The method of claim 23, wherein the first application server hosting the coordinator is in a first domain and the second application server hosting the sub-coordinator is in a second domain.

30. The method of claim 23, wherein the first application server hosting the coordinator is in a first domain and the second application server hosting the sub-coordinator is also in the first domain.

* * * * *

UNITED STATES PATENT AND TRADEMARK OFFICE
CERTIFICATE OF CORRECTION

PATENT NO. : 7,975,138 B2
APPLICATION NO. : 11/779510
DATED : July 5, 2011
INVENTOR(S) : Andrade It is certified that error appears in the above-identified patent and that said Letters Patent is hereby corrected as shown below:

In column 2, line 16, delete "JavaBean" and insert -- Java Bean --, therefor.

In column 3, line 34, delete "TransactionManager" and insert -- Transaction Manager --, therefor.

In column 10, line 57, delete "ecrypted" and insert -- encrypted --, therefor.

In column 19, line 11, in Claim 12, delete "transaction" and insert -- a transaction --, therefor.

Signed and Sealed this
Fifteenth Day of November, 2011

David J. Kappos
*Director of the United States Patent and Trademark Office*